Sept. 27, 1966  F. G. WEIGHART  3,274,821
ULTRASONIC TESTING APPARATUS HAVING IMPROVED RESOLUTION
Filed Oct. 24, 1962  3 Sheets-Sheet 1
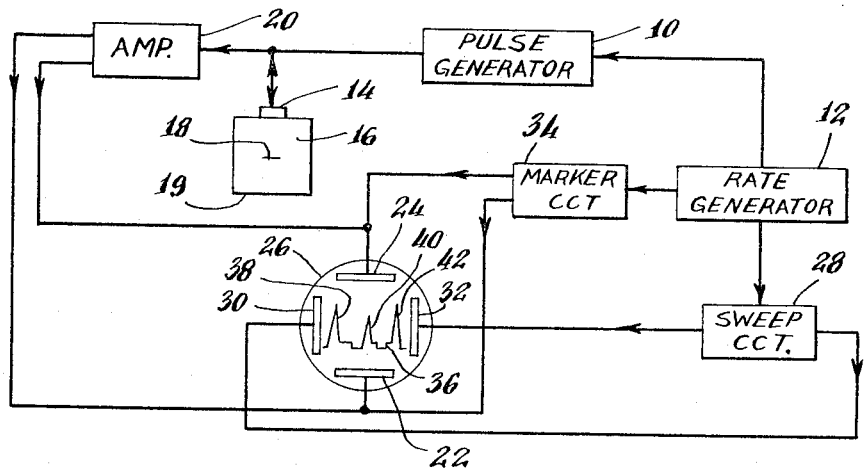
Fig. 1.
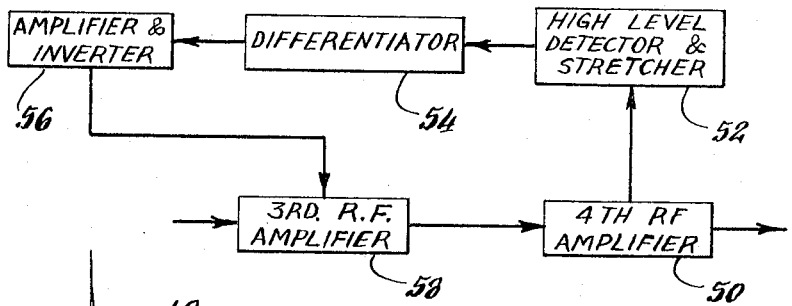
Fig. 5.
Fig. 4.
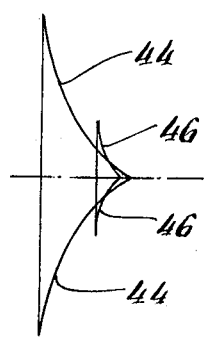
Fig. 2.
(PRIOR ART)
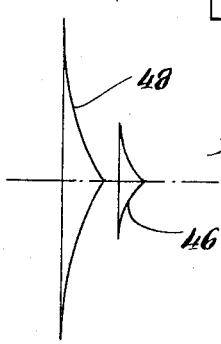
Fig. 3.
INVENTOR.
Frederick G. Weighart
BY
Wooster, Davis & Cifelli
Attys.

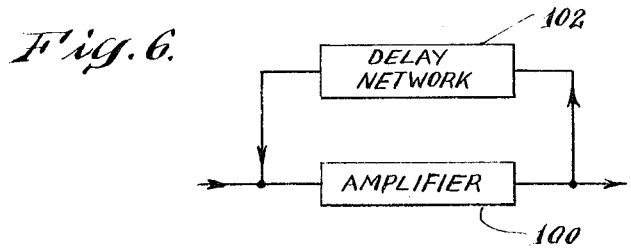
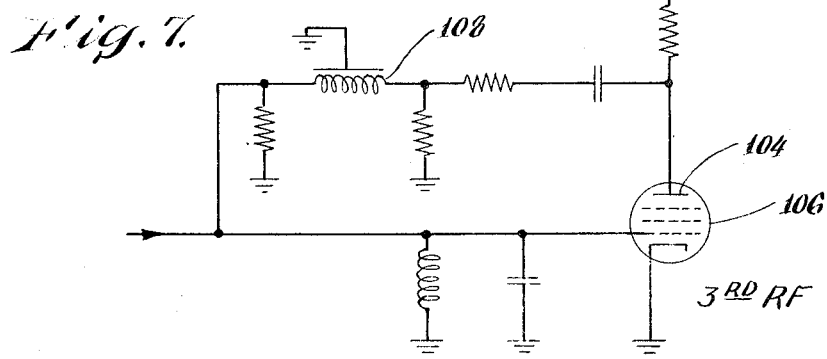
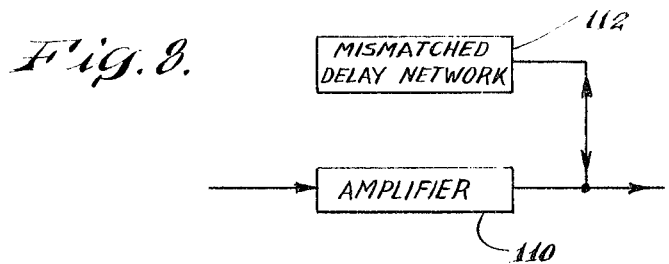
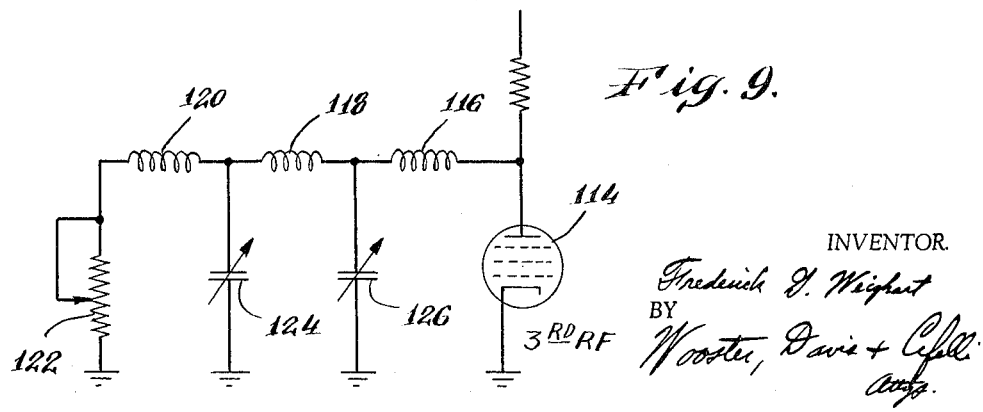

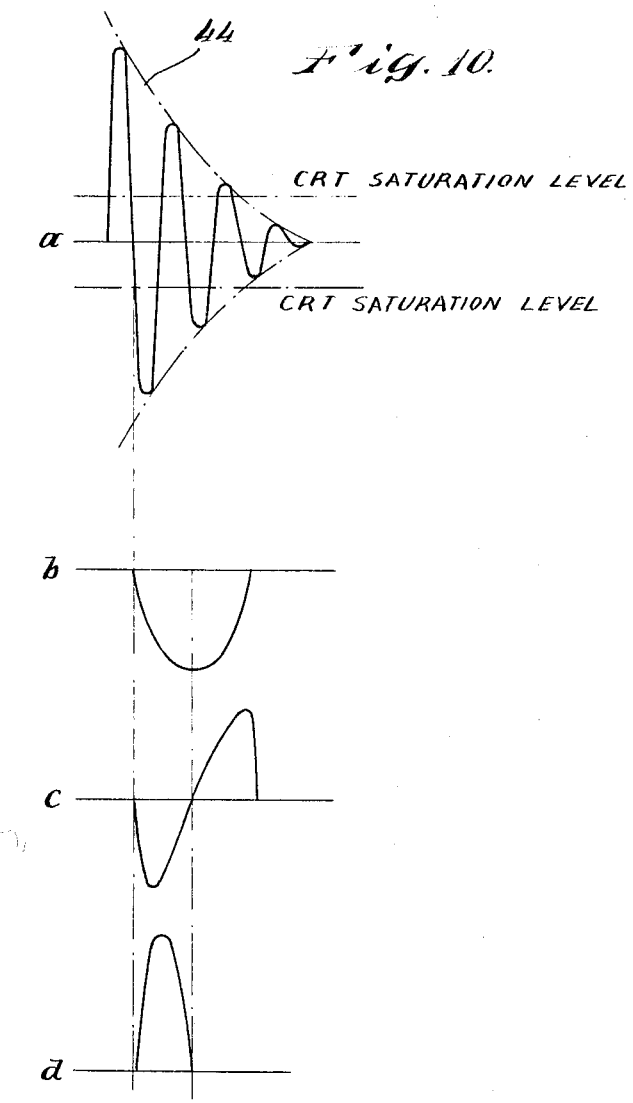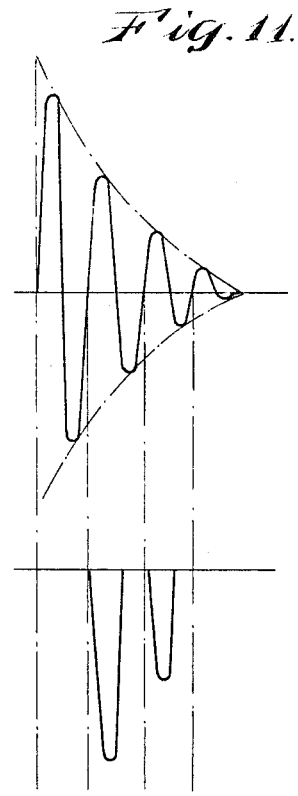

United States Patent Office 3,274,821
Patented Sept. 27, 1966

3,274,821
ULTRASONIC TESTING APPARATUS HAVING
IMPROVED RESOLUTION
Frederick Gordon Weighart, Brookfield, Conn., assignor to Automation Industries, Incorporated, El Segundo, Calif., a corporation of California
Filed Oct. 24, 1962, Ser. No. 232,766
2 Claims. (Cl. 73—67.8)

This invention relates to improvements in ultrasonic testing and, more particularly, to improved signal resolution in ultrasonic flaw-detection apparatus.

In United States Patent No. 2,398,701, granted April 16, 1946, to F. A. Firestone, there is described an instrument for nondestructive material inspection by means of ultrasonics. In testing materials in accordance with the technique described therein, a short high frequency electrical pulse is applied to a piezoelectric transducer. The frequency of the pulse is in the ultrasonic range, and may be, for example, from one to five megacycles per second. The transducer vibrates at the ultrasonic frequency and is coupled to a piece to be tested through an intervening medium, such as a body or film of oil or water. The ultrasonic vibrations travel through the piece under test and are reflected from the opposite side as well as from any flaws or cavities which may be contained in the material. Upon striking the transducer, an electrical "echo signal" is generated. Both the transmitted pulse and its various echoes are amplified and applied to the vertical deflection plates of a cathode ray tube. The horizontal sweep of the cathode ray tube is set so as to provide a visual indication of defect depth.

This method of nondestructive ultrasonic testing has been of great commercial value for a number of years. However, it is not always simple for the operator of such a device to detect defects which occur near the surface of the material. Although it is a relatively simple matter to shorten the electrical pulse applied to the transducer, it is not so simple to shorten the "train" of ultrasonic vibrations. This is because the ultrasonic vibrations are mechanical in character. Once the transducer begins to vibrate in sympathy with an applied signal, these vibrations will not come to an abrupt halt upon cessation of the electrical input. Rather, the vibratory oscillations of the transducer will decay exponentially. For example, a wave train consisting of ten cycles at a frequency of one megacycle per second in a metal may occupy one inch of sweep time on a cathode ray oscilloscope. If a defect lies near the surface of the piece being tested, the echo from the defect may coincide with this decaying input pulse signal. Such an echo will not be resolved by equipment known to the prior art and will be essentially hidden in the wave train of the input pulse. The amplifiers used in typical systems also tend to "ring" or "stretch" the signals even when the initial pulse contains only a single cycle. The resolution of such systems, i.e., the ability to detect a small signal immediately after a large one, is limited to about 5 to 10 cycles, depending upon the absolute signal amplitudes involved. The problem is further complicated by extraneous noise signals which are often present due to the grain structure or porosity of the material under test.

It is, therefore, the primary object of this invention to improve the resolution of signals received from a material under ultrasonic test. Other objects are to improve the detection of defects near the surface of the material and to improve the detection of small area discontinuities.

In one embodiment of the present invention disclosed herein this and other objectives are accomplished by providing a high level detector that is responsive to signals exceeding a threshold level somewhat greater than the signals produced as a result of a normal defect. The threshold level is less than the level which produces extended ringing in the amplifier. Whenever the detector senses a signal in excess of the threshold level, a signal is fed back to the amplifier so as to reduce its gain to a low enough level to prevent ringing.

The manner in which the foregoing objects are attained will be more apparent from the following description, the appended claims and the figures of the attached sheets of drawings, wherein:

FIG. 1 is a block diagram of a nondestructive testing device;

FIG. 2 is an illustration showing the shortcomings of the prior art devices;

FIG. 3 is an illustration showing the improvements achieved by the present invention;

FIG. 4 is a block diagram of one embodiment of the improvement of this invention;

FIG. 5 is a schematic diagram corresponding to the diagram of FIG. 4;

FIG. 6 is a block diagram of an alternative embodiment of this invention;

FIG. 7 is a schematic diagram corresponding to the diagram of FIG. 6;

FIG. 8 is a block diagram illustrating still another embodiment of this invention;

FIG. 9 is a schematic diagram corresponding to the block diagram of FIG. 8;

FIG. 10 is an illustration showing the waveshapes produced at various portions of the embodiment of FIG. 4; and FIG. 11 is an illustration showing the operation of the embodiments of FIGS. 6 and 8.

The objects of this invention are attained by detecting those signals from the ultrasonic transducer which supply the cathode ray tube. Negative feedback proportional to the detected signal is then applied to the amplifier.

In FIG. 1 there is illustrated an ultrasonic reflectoscope of the type referred to herein. A pulse generator 10 is activated by a rate generator 12 to produce ultrasonic pulses which are applied to a piezoelectric transducer 14. Transducer 14 converts the electrical impulses into acoustic impulses which pass into the test specimen 16 through a suitable couplant such as oil or water. The acoustic impulses propagate through test specimen 16 until they strike a reflecting boundary, such as the defect 18. They are thereupon reflected back to transducer 14 which generates an electrical voltage. Both the initial electrical impulse and the reflected impulse are amplified by a suitable amplifier 20 and the amplified voltage is applied across the vertical deflection plates 22, 24 of a cathode ray tube 26. A horizontal time base for the cathode ray tube 26 is provided by the sweep circuit 28 which is initiated by the rate generator 12 upon generation of the initial impulse. The sweep signal is applied to the horizontal deflection plate 30, 32 of the cathode ray tube. A marker circuit 34 may also be employed to indicate along the time base of the cathode ray tube suitable indexing marks 36 for use in determining the depth of a defect in the material. The cathode ray tube illustrated in FIG. 1 shows three vertical deflections. The first deflection 38 is due to the initial impulse, the second deflection 40 is the reflection from the discontinuity 18, and the final deflection 42 is from the far surface 19 of test specimen 16. In the illustration of FIG. 1, the vertical deflection 40 is well separated for the initial impulse deflection 38. However, if the discontinuity 18 is very near the surface of the test specimen 16, it becomes very difficult to distinguish the two deflections. The reason for this is best illustrated by FIG. 2. As previously explained, the impulse provided by the piezoelectric transducer 14 is not a single one-cycle pulse, but rather a short pulse train. The exponentially decreasing sine wave in FIGURE 10a is such a wave train. The curves 44 in FIGURES 2 and 10a represent the envelope that fits such a train. These two figures represent the amplified signals produced by the amplifier 20. It will be noted that the decay of this signal 44 is exponential in form, resulting in a relatively long trailing edge. This is due in part to ringing of the ultrasonic transducer 14 and in part to ringing of the amplifier 20. Ringing of the amplifier 20 is normally aggravated when the amplitude of the signal is large enough to saturate or nearly saturate one or more portions of the amplifier 20. When the discontinuity 18 is close to the entrant surface of the material the signal 46 produced by an echo from the discontinuity 18 may occur before the end of the signal 44. This is illustrated by curve 46 which illustrates the envelope of the echo signal from such a discontinuity. As illustrated in FIG. 2, the echo signal 46 is substantially hidden in the pulse signal 44. In an actual test there may also be considerable noise present which further complicates the resolution of such an echo signal. In accordance with the invention whenever a negative portion of any signal begins to approach the saturation level of the amplifier 20 a feed back signal is coupled back to the amplifier 20. This signal is effective to reduce the gain of the amplifier to a sufficiently low level to preclude any ringing of the amplifier and to reduce the amplitude of the terminal portion of the amplified signal. In this manner, the amplified representation of the initial pulse is caused to decay at a very rapid rate, as illustrated by the envelope 48 of FIG. 3. The unsaturated reflection signal 46, however, is not affected, so that the two signals are resolved as illustrated.

One circuit for accomplishing the result illustrated in FIG. 3 is shown in the block diagram of FIG. 4. This circuit illustrates a portion of the amplifier 20 of FIG. 1. As illustrated, a signal is taken from the fourth amplifier stage 50. A high level detector 52 selects the initial portion of any signals which exceeds a threshold level that is just below the level at which ringing would occur. In the present instance only the initial negative portion is selected and stretched by a suitable filter circuit and applied to a differentiator 54. The differentiated signal is then amplified and inverted by circuit 56 and is fed back to the third amplifier stage 58. The stretching and differentiating steps are performed in order to control the shape of the feedback wave so as to cause it to coincide with the signal to be damped. The exact manner in which this is accomplished is more clearly illustrated by FIG. 5.

In FIG. 5, the circuit of FIG. 4 is illustrated in schematic form. Pentodes 60, 62 are the third and fourth R.F. amplification stages (58, 50), respectively, of amplifier 20. The output signal from the plate 64 of the fourth R.F. stage 62 is applied to a detector circuit including capacitor 66, resistor 68, and a diode 70. Diode 70 is so oriented that only the negative portion of the output signal is passed. The negative signal is then filtered by a filter circuit comprising resistors 72, and capacitors 74, and then passes through an amplifier consisting of a transistor 76 having a grounded emitter for high gain and polarity inversion. Resistors 80 and 72 form a voltage divider for setting the detection level of diode 70 to select only signals which exceed the saturation level of the amplifier. Resistor 78 and capacitor 82 form the differentiating network. Capacitor 84 is a coupling capacitor and 86 a cathode bypass capacitor. The signal is then applied to the cathode 88 of the third stage pentode 60.

The wave shapes produced in the embodiment of FIGURES 4 and 5 are illustrated in FIGURE 10 wherein they are keyed to FIGURE 4 by the letters "a" through "d." FIGURE 10a corresponds to the prior art conditions of FIGURE 2 and illustrates the exponentially decaying wave train and how the envelope 44 fits this train. This figure illustrates the undesirable output which the present invention prevents. The high level detector and stretcher circuit 52 responds to the first negative half cycle that exceeds some preselected amplitude. In this embodiment the preselected amplitude is approximately equal to, or slightly less than, the level at which the amplifier 20 saturates and/or tends to ring. This negative pulse is stretched at 52 to produce a signal as shown in FIGURE 10b. The stretched pulse is then differentiated as in FIGURE 10c.

The amplifier and inverter 56 amplifies and inverts the negative half cycle to provide a positive pulse signal similar to that in FIGURE 10d. This positive pulse is then fed back to the cathode 88 of tube 60 so as to reduce the gain of the third R.F. amplifier 58. By comparing wave shapes of FIGURES 10d and 10a it will be noted that the amplitude of the first positive half cycle will not be greatly reduced. However the amplitude of the first negative half cycles and all of the subsequent portions of the signal will be rapidly reduced to zero.

This results from the fact that immediately following the beginning of a high amplitude signal the gain of the amplifier 20 is drastically reduced and the extended oscillations of FIGURE 10a never have a chance to build up or to continue. Instead they are very rapidly damped out. In this manner the initial pulse is caused to decay very rapidly, as illustrated at 48 of FIGURE 3 so that it cannot interfere with the received echo signal 46. The duration of the stretched and shaped signal is empirically selected so as to be long enough to prevent ringing of the amplier. However, at the same time it is short enough to allow the amplifier gain 20 to return to normal before the beginning of the signal 46 from a close in defect 18.

It will be noted that the feedback circuit just described is selective in nature and supplies half-wave rectified R.F. voltage which is shaped and amplified. Not all signals provide the feedback voltage but only those which exceed the preselected amplitude determined by the voltage divider comprising resistors 72 and 80. Furthermore the differentiating circuit is set so that the feed back signal limiting the gain of the amplifier is derived from the first negative half cycle that exceeds the threshold level. As a result the gain is rapidly decreased immediately after the beginning of the first positive half cycle period and amplifier ringing is stopped. The leading positive portion of the large input pulse is not materially affected. Also, the gain of the amplifier 20 is not modified by a normal defect signal that does not exceed the threshold level. As a consequence the low amplitude signals are not disturbed.

Another method of accomplishing results similar to those above is to utilize the normal output of an amplifier while delaying the positive portion of each output cycle and feeding it back with negative polarity. If the delay is equal to the time of one cycle, it will be seen that the negative (or out-of-phase) feedback applied to each recurring signal is proportional to the larger signal preceding it. This method, of course, does not prevent the gain of the echo signal from being reduced. Any half cycle signal that is preceded by a larger half cycle signal will be damped. Two methods of achieving such a delayed signal are illustrated in block diagram form in FIGS. 6 and 8. In FIG. 6 the output from an amplifier 100 is passed through a delay network 102 and fed back into the amplifier input as illustrated. A method of arranging a circuit in accordance with this technique is illustrated in FIG. 7. In this illustration the signal employed is the output from the plate 104 of the third R.F. amplification stage 106. When employed with a reflectoscope operating at a frequency of five megacycles per second, good results have been attained utilizing a delay line 108 for introducing a .2 microsecond delay. Good resolution at a defect depth of 3/16 inch was attained, and defects at 1/8 inch depth were easily seen.

Another advantage of the circuit of FIG. 7 is that it makes it possible to decrease the band width and increase the amplification of the circuit without the usual decrease in resolution due to ringing. It thus becomes possible to make an operable narrow band receiver with its consequent advantages of cheapness, due to fewer stages, and low noise because of its amplification selectivity.

In the circuit of FIG. 8, a still further embodiment of the invention is disclosed. In this circuit the output of amplifier 110 is directed to a mismatched delay network 112 and reflected back to the amplifier output to provide and out-of-phase signal reducing component. Exemplary circuitry for this embodiment is illustrated in FIG. 9 wherein a portion of the output of the third R.F. amplifier stage 114 is fed to a circuit comprising series-connected inductors 116, 118 and 120. The inductors are connected in series with a variable resistor 122 to ground. The connections intermediate adjacent inductors are also connected to ground through variable capacitors 124, 126. These elements, taken together, form a lumped constant delay line which permits adjustment of delay time by variation of capacitors 124, 126. In one embodiment of this circuit inductors 116, 118 and 120 each had an inductance of 90 microhenries. Capacitors 124 and 126 were each adjusted to approximately 20 micro-microfarads and potentiometer 122 was set to provide a resistance of 330 ohms.

FIG. 11 illustrates the orginal and feed back signals produced by the embodiments of FIGS. 6 and 8.

It will be seen that the invention described above provides important advantages over apparatus known to the prior art. It will also be apparent to those skilled in the art that a number of variations and modifications may be made in this invention without departing from the spirit and scope thereof. Accordingly, it is to be understood that the foregoing description is illustrative rather than limiting. This invention is to be construed as limited only by the scope of the following claims.

What I claim as new and desire to secure by Letters Patent of the United States is:

1. An ultrasonic inspection system of the class described for ultrasonically inspecting a workpiece, said system including the combination of an amplifier, a transducer means for transmitting a pulse of ultrasonic energy through an entrant surface and into the workpiece and receiving echoes of the pulse reflected from said workpiece and produce echo signals, the echo signal corresponding to the entrant surface being greater than a predetermined level corresponding to the saturation level of the amplifier at which the amplifier rings and the echo signals corresponding to discontinuities being less than said level, said amplifier having an input coupled to the transducer for receiving the echo signals therefrom, said amplifier having an output to provide amplified echo signals, feedback means coupled from the output back to the input to decrease the gain of said amplifier, and means in said feedback means effective to allow feedback only when the amplitude of an echo signal exceeds said predetermined level to thereby prevent ringing of the amplifier and cause rapid decay of the echo signals having amplitudes in the region of said predetermined level.

2. An ultrasonic inspection system of a class described for ultrasonically inspecting a workpiece, said system including the combination of transducer means for transmitting pulses of ultrasonic energy through an entrant surface and into the workpiece, said transducer means being effective to produce echo signals in excess of a predetermined level from said entrant surface and to produce echo signals corresponding to echoes reflected from discontinuities in said workpiece, said echoes from said discontinuities being less than said level, an amplifier having an input and output, said input being coupled to the transducer means, said amplifier being effective to amplify the echo signals and provide an amplified signal on said output, said amplifier means tending to ring when the signal is in the region of said level, feedback means coupled from the output back to the input, said feedback means including amplitude responsive means and being effective to decrease the gain of said amplifier whenever the echo signals are in the region of said predetermined level.

References Cited by the Examiner

UNITED STATES PATENTS

| 2,217,957 | 10/1940 | Lewis | 328—56 |
| 2,280,226 | 4/1942 | Firestone | 73—67.8 |
| 2,413,182 | 12/1946 | Hollingsworth et al. | 328—58 |
| 2,440,289 | 4/1948 | Pensyl | 343—17.1 |
| 2,532,347 | 12/1950 | Stodola | 343—13 X |
| 2,842,959 | 7/1958 | Henry | 73—67.8 |
| 3,033,029 | 5/1962 | Weighart | 73—67.8 |
| 3,046,483 | 7/1962 | Breskind | 328—56 |

FOREIGN PATENTS

| 581,968 | 10/1946 | Great Britain. |
| 139,137 | 6/1961 | Russia. |
| 148,949 | 7/1962 | Russia. |

RICHARD C. QUEISSER, *Primary Examiner.*

JOHN P. BEAUCHAMP, *Assistant Examiner.*